(12) United States Patent
Trautwein

(10) Patent No.: US 9,677,586 B2
(45) Date of Patent: Jun. 13, 2017

(54) ANCHOR

(71) Applicant: Hilti Aktiengesellschaft, Schaan (LI)

(72) Inventor: Bernd Trautwein, Broken Arrow, OK (US)

(73) Assignee: Hilti Aktiengesellschaft, Schaan (LI)

(*) Notice: Subject to any disclaimer, the term of this patent is extended or adjusted under 35 U.S.C. 154(b) by 0 days.

(21) Appl. No.: 14/783,374

(22) PCT Filed: Apr. 2, 2014

(86) PCT No.: PCT/EP2014/056564
§ 371 (c)(1),
(2) Date: Oct. 8, 2015

(87) PCT Pub. No.: WO2014/166784
PCT Pub. Date: Oct. 16, 2014

(65) Prior Publication Data
US 2016/0053793 A1     Feb. 25, 2016

(30) Foreign Application Priority Data

Apr. 11, 2013  (DE) .................. 10 2013 206 387

(51) Int. Cl.
*F16B 13/06* (2006.01)
(52) U.S. Cl.
CPC .................. *F16B 13/065* (2013.01)
(58) Field of Classification Search
CPC ...... F16B 13/06; F16B 13/065; F16B 13/066; F16B 13/0833; F16B 13/0866; F16B 13/124; F16B 13/128
USPC .............. 411/55, 57.1, 60.2, 63, 72
See application file for complete search history.

(56) References Cited

U.S. PATENT DOCUMENTS

| | | | | |
|---|---|---|---|---|
| 948,938 A * | 2/1910 | Skidmore | ............ | F16B 13/065 411/55 |
| 1,265,866 A * | 5/1918 | Ackerman | ............ | F16B 13/065 411/32 |
| 1,276,708 A * | 8/1918 | Bair | ............ | F16B 13/066 411/53 |
| 1,291,119 A * | 1/1919 | Pleister | ............ | F16B 13/066 411/65 |
| 1,471,911 A * | 10/1923 | Ogden | ............ | F16B 13/066 411/53 |

(Continued)

FOREIGN PATENT DOCUMENTS

| | | |
|---|---|---|
| CA | 953958 | 9/1974 |
| DE | 2256822 | 6/1974 |

(Continued)

*Primary Examiner* — Roberta Delisle
(74) *Attorney, Agent, or Firm* — Davidson, Davidson & Kappel, LLC

(57) ABSTRACT

The invention relates to an anchor (1) that can be secured in a drilled hole (2), with an expansion sleeve (10) for anchoring onto a wall (3) of the drilled hole, and with an anchor bolt (20) that passes through the expansion sleeve and that has an expansion section (38) for widening the expansion sleeve, and it also has a stop (22) that limits axial movement of the expansion sleeve away from the expansion section. According to the invention, at least one rotary catch (24) is provided which non-rotatably couples the expansion sleeve to the anchor bolt, and the expansion sleeve has at least one cutting projection (14) for creating an undercut in the wall of the drilled hole.

8 Claims, 1 Drawing Sheet

(56) References Cited

U.S. PATENT DOCUMENTS

| | | | |
|---|---|---|---|
| 2,642,768 A * | 6/1953 | Ogburn | E21D 21/008 294/95 |
| 5,176,481 A | 1/1993 | Schiefer | |
| 5,685,678 A * | 11/1997 | Giannuzzi | F16B 13/066 411/55 |
| 5,702,216 A * | 12/1997 | Wu | F16B 13/066 411/32 |
| 5,816,760 A | 10/1998 | Mattner et al. | |
| 6,029,417 A | 2/2000 | Leibhard et al. | |
| 6,238,128 B1 | 5/2001 | Kaibach et al. | |
| 6,524,046 B2 * | 2/2003 | Hsu | F16B 13/065 411/51 |
| 8,192,122 B2 * | 6/2012 | Gaudron | F16B 13/066 411/32 |
| 2006/0263167 A1 | 11/2006 | Linka et al. | |
| 2007/0224015 A1 * | 9/2007 | Ayrle | F16B 13/065 411/55 |

FOREIGN PATENT DOCUMENTS

| | | |
|---|---|---|
| DE | 29501182 | 3/1995 |
| DE | 19622544 | 12/1997 |
| DE | 10324005 | 12/2004 |
| DE | 10357702 | 7/2005 |
| DE | 60109888 | 3/2006 |
| DE | 10 2010 063675 | 6/2012 |
| EP | 1243801 | 4/2005 |

* cited by examiner

Fig. 1
Fig. 2
Fig. 3
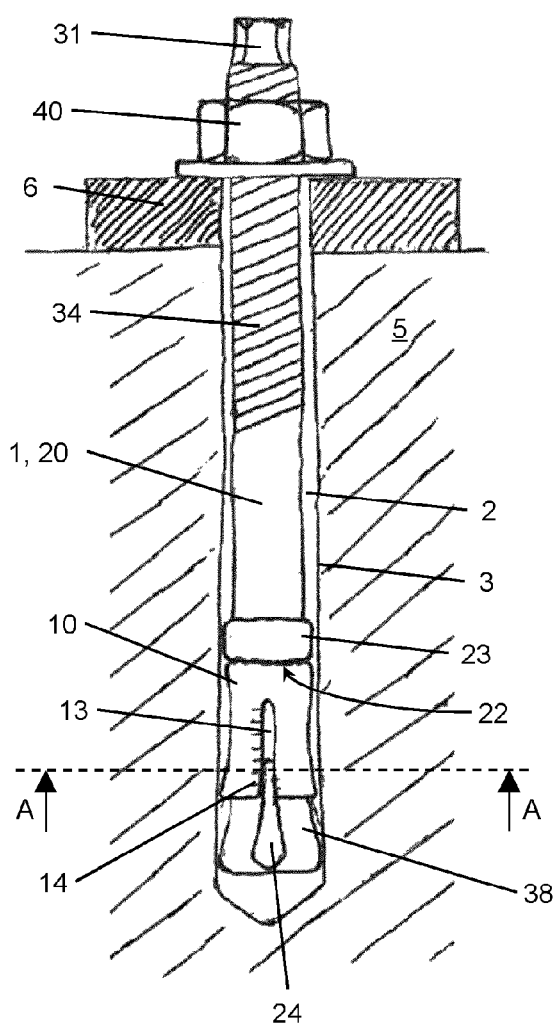
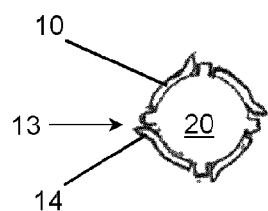
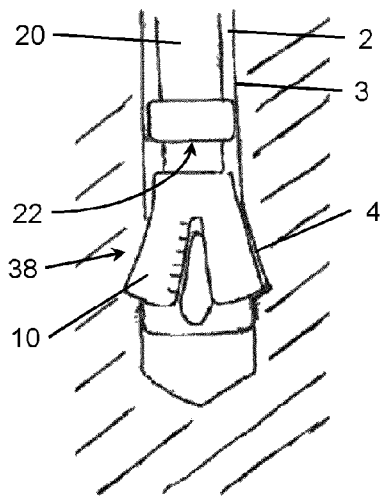

ANCHOR

The invention relates to an anchor that can be secured in a drilled hole. Such an anchor is configured with an expansion sleeve for anchoring onto a wall of the drilled hole and with an anchor bolt that passes through the expansion sleeve and that has an expansion section for widening the expansion sleeve, and it also has a stop that limits axial movement of the expansion sleeve away from the expansion section.

BACKGROUND

In the realm of fastening technology involving a substrate made of concrete, a distinction is made between insert elements that are cast into the concrete and anchors that are subsequently installed and that are anchored in the already hardened concrete. When it comes to the subsequently installed anchors, numerous types are known such as, for instance, expansion anchors (known, for example, from U.S. Pat. No. 5,176,481 A), screw anchors (known for example, from German patent application DE 10 2010 063675 A1), chemical anchor systems (known, for example, from U.S. Pat. No. 6,029,417 A) and undercut anchors (known, for example, from U.S. Pat. No. 6,238,128 B).

Undercut anchors are anchored in the substrate with a positive fit, which renders them particularly well-suited for dynamic loads and large crack widths, and also allows relatively high load ratings under a central traction. Moreover, undercut anchors display a load-bearing behavior similar to that of inserted head bolts. Owing to these properties, undercut anchors are considered to be very safe and reliable and this is why they are often employed for applications that call for a high degree of safety.

However, the installation of undercut anchors can be relatively complex and labor-intensive since, as a rule, the installation requires special accessories such as, for example, stop drill bits, undercut drill bits and/or installation tools. The costs incurred for these special tools often have to be included in the costs per installed fastening point, so that undercut anchors often entail higher costs per installed fastening point than in the case of other anchors such as, for instance, bolt anchors. Moreover, the installation of an undercut anchor is frequently quite time-consuming.

Due to the often relatively high costs and the often relatively labor-intensive installation, the field of application is usually restricted to the niche of applications that call for a high degree of safety or else to applications in which other types of anchor cannot be used due to the more stringent requirements, for instance, dynamic loads or large crack widths.

SUMMARY OF THE INVENTION

It is an object of the invention to provide an anchor that is particularly reliable and achieves high load ratings while also being easy to install and to produce.

The present invention provides an anchor that has at least one rotary catch that is provided which non-rotatably couples the expansion sleeve to the anchor bolt, and in that the expansion sleeve has at least one cutting projection for creating an undercut in the wall of the drilled hole.

A fundamental idea of the invention can be seen in an expansion anchor in which the expansion sleeve has at least one cutting projection non-rotatably joined to the anchor bolt. In this manner, the expansion sleeve can be made to rotate in the drilled hole by means of the anchor bolt, and the rotating expansion sleeve, in turn, can create an undercut in the drilled hole. Thus, the anchor can fulfill a dual role. On the one hand, it can serve in the usual manner to provide anchoring in the drilled hole while, on the other hand, it can also function as an undercut drill bit. Therefore, according to the invention, a particularly reliable anchoring on an undercut can be achieved without this requiring an additional undercut drill bit. Consequently, according to the invention, especially high load ratings can be attained while, at the same time, the installation can be carried out very easily, quickly and conveniently, without special tools.

Preferably, the expansion sleeve and/or the anchor bolt are made of metal. The anchor bolt tapers in the expansion section in the direction of the stop, that is to say, the cross section of the anchor bolt increases in the expansion section as the distance from the stop increases. In the non-expanded initial state, the expansion sleeve is situated between the expansion section and the stop. In the installed state, the expansion section has been pulled into the expansion sleeve. In particular, the expansion section can be configured conically, at least in certain areas.

Whenever mention is made here of the axial direction and the radial direction, this can especially refer to the longitudinal axis of the anchor bolt. The rotary catch couples the expansion sleeve to the anchor bolt so that it cannot rotate but can be moved axially. The anchor bolt and/or the expansion sleeve is/are preferably rotated around the longitudinal axis of the anchor bolt, and consequently, the non-rotatable coupling brought about by the rotary catch preferably likewise refers to a rotation around the longitudinal axis of the anchor bolt. Several rotary catches can be provided in order to ensure a highly reliable coupling.

An axial movement of the expansion sleeve relative to the anchor bolt causes the expansion section of the anchor bolt to be pulled into the expansion sleeve, a process in which the expansion sleeve can be widened for creating an undercut as well as for anchoring purposes. It is especially preferable for the expansion section to be arranged so as to be closer to the end of the anchor bolt than to the stop. In particular, the drilled hole can be made in a concrete substrate. The wall of the drilled hole in which the undercut is created can preferably be configured so as to be approximately cylindrical.

It is particularly advantageous for the expansion sleeve to have at least one slit. This can simplify the production. Preferably, several slits, preferably running in parallel, can be provided. As a result, the expansion behavior of the sleeve can be improved. The at least one slit can especially extend in the axial direction and preferably run parallel to the axial direction.

Fundamentally speaking, the rotary catch could be configured on the expansion sleeve, for example, in the form of a projection that engages with a groove in the anchor bolt. However, it is especially preferable for the rotary catch to have a projection that protrudes from the anchor bolt and that engages with the slit. According to this embodiment, the slit can assume a dual function and can serve to establish a rotational coupling as well as to improve the expansion behavior, so that a small amount of effort translates into a high level of functionality. If there are several slits, each one of them, or else just some of the slits, can be associated with a corresponding projection on the bolt functioning as the rotary catches. Several projections on the bolt can also be associated with an individual slit as the as the rotary catch.

The cutting projection protrudes from the outside of the expansion sleeve. Especially preferably, on the slit, the expansion sleeve has a bent section that forms the cutting projection. This can be advantageous from the standpoint of its production. The bent section is preferably bent around one or more bending axes that run parallel to the longitudinal axis of the anchor bolt. If there are several slits, a bent section can be present on all of the slits or else only on some of the slits.

Especially preferably, the projection that protrudes from the anchor bolt and that forms the rotary catch is a web. Advantageously, the web extends in the expansion section, at least in certain areas. This yields a rotating coupling that is reliable and inexpensive. The web suitably runs in the axial direction. It preferably can widen as the distance from the stop increases. This advantageously assists the expansion of the expansion sleeve.

It is likewise advantageous for the anchor bolt to have a surface of force application. The surface of force application is preferably a polygon, especially an external polygon, for instance, an external hexagon or an internal polygon. The surface of force application can positively, non-rotatably couple an installation tool to the anchor bolt. Consequently, a torque can be transmitted from the installation tool to the anchor bolt and the anchor bolt can be made to rotate in order to create the undercut. The surface of force application can especially be arranged at the end of the anchor bolt that is opposite from the expansion section.

It is likewise preferred for the anchor bolt to have an external thread on which a nut having an internal thread that corresponds to the external thread is arranged. On the one hand, the nut can serve in a conventional manner to affix an attachment part to the anchor bolt with a positive fit. On the other hand, the nut, together with the external thread of the anchor bolt, can form a screw mechanism which converts a rotation of the anchor bolt—applied, for example, to the surface of force application—into an axial movement of the anchor bolt which, in turn, can pull the expansion section into the expansion sleeve and can widen the expansion sleeve. Therefore, the screw mechanism, which is formed by the nut and the external thread of the anchor bolt, can convert a purely rotational movement on the installation tool into a combined rotational and axial movement on the bolt, thus allowing for the creation of a continuous undercut. This permits the use of a very simple installation tool that merely needs to generate a rotational movement, that is to say, very little effort is required for the installation. The installation tool can be, for example, a tangential impact driver.

The invention can provide an expansion anchor which, during the expansion process, automatically creates an undercut and thus becomes an undercut anchor. Since the expansion sleeve creates an undercut in the wall of the drilled hole, it can also be referred to as a cutting sleeve.

The invention also relates to a method for installing an anchor according to the invention in a drilled hole, whereby the anchor is inserted into the drilled hole and an undercut is created in the drilled hole by means of the anchor.

BRIEF DESCRIPTION OF THE DRAWINGS

The invention will be explained in greater detail below on the basis of preferred embodiments that are schematically shown in the accompanying figures. The following is shown:

FIG. 1 a side view of an example of an anchor according to the invention, in a drilled hole at the beginning of the installation procedure according to the invention;

FIG. 2 a cross-sectional view A-A of the anchor from FIG. 1; and

FIG. 3 a detailed view of the side of the anchor from FIG. 1, in the area of the expansion sleeve after completion of the installation procedure.

DETAILED DESCRIPTION

FIGS. 1 to 3 show an embodiment of an anchor according to the invention, namely, at the beginning of the installation procedure in FIGS. 1 and 2, and after completion of the installation procedure in FIG. 3.

The anchor 1 has an anchor bolt 20 as well as an expansion sleeve 10, whereby the expansion sleeve 10 surrounds the anchor bolt 20. At the lower end of the anchor bolt 20, there is an expansion section 38 in which the cross section of the anchor bolt 20 increases continuously in order to widen the expansion sleeve 10 downwards. Preferably, the anchor bolt 20 can be configured conically in the expansion section 38. The anchor bolt 20 also has a stop 22 that limits an axial movement of the expansion sleeve 10 upwards, away from the expansion section 38. The stop 22 is formed on a ring-shaped shoulder 23 that surrounds the anchor bolt 20.

At its upper end opposite from the expansion section 38, the anchor bolt 20 has a surface of force application 31 that is configured as an external hexagon. Between the surface of force application 31 and the stop 22 and/or the ring-shaped shoulder 23, the anchor bolt has an external thread 34 on which a nut 40 having a corresponding internal thread is arranged.

The expansion sleeve 10 has several slits 13, four in the embodiment shown here, that, starting at the end face of the expansion sleeve 10 facing the expansion section 38, extends into the expansion sleeve 10. Four expansion tabs are formed between these slits 13. The outside of the expansion sleeve 10 also has four cutting projections 14. These cutting projections 14 are formed by bent sections of the expansion sleeve 10 that run along the slits 13.

The anchor bolt 20 has four rotary catches 24 that couple the expansion sleeve 10 to the anchor bolt 20 in a non-rotatable but axially movable manner. The rotary catches 24 are configured as webs, whereby each web engages with one of the slits 13 of the expansion sleeve 10. The webs, which run in the axial direction, widen as the distance from the stop 22 increases, so that they can assist the expansion of the expansion sleeve 10.

The installation procedure of the anchor is illustrated in FIGS. 1 and 3. First of all, the anchor bolt 20 is inserted through an attachment part 6 and, with the expansion section 38 leading, the anchor bolt 20 is inserted into a drilled hole 2 in a substrate 5. In this process, the stop 22 prevents the anchor sleeve 10 from shifting on the anchor bolt 20. The anchor bolt 20 is inserted so deep into the drilled hole 2 until the nut 40 presses the attachment part 6 onto the substrate 5. This state is shown in FIG. 1.

Subsequently, an installation tool, for instance, a tangential impact driver, is placed onto the surface of force application 31, thus causing the anchor bolt 20 to rotate. The fact that a screw mechanism is formed between the anchor bolt 20 and the nut 40 that is in contact with the attachment part 6, and thus with the substrate 5, accounts for the fact that this rotation leads to an axial movement of the anchor bolt 20 that retracts the anchor bolt 20 out of the substrate 5 (in this context, it might be necessary to use, for instance, a box wrench or an open-end wrench, to affix the nut 40 so that it cannot turn). Owing to this axial movement, the expansion area 38 of the anchor bolt 20 is pulled into the expansion sleeve 10 that is axially secured in the substrate 5 with a frictional fit, as a result of which the expansion sleeve 10 widens. At the same time, due to the rotary catch 24 on the anchor bolt 20, the expansion sleeve 10 rotates along. The cutting projections 14 on the expansion tabs of the expansion sleeve 10 are pressed against the wall 3 of the drilled hole and, due to the tangential stop, they chisel material out of the concrete substrate 5. This gives rise to an approximately conical undercut 4 in which the expansion sleeve 10 is automatically anchored with a positive fit. This anchored state at the end of the installation procedure is shown in FIG. 3.

What is claimed is:

1. A method for installing into a drilled hole an anchor securable in the drilled hole, the anchor including an expansion sleeve for anchoring onto a wall of the drilled hole the expansion sleeve having at least one cutting projection for creating an undercut in the wall of the drilled hole; an anchor bolt passing through the expansion sleeve, the anchor bolt having an expansion section for widening the expansion sleeve and a stop limiting axial movement of the expansion sleeve away from the expansion section; and at least one rotary catch non-rotatably coupling the expansion sleeve to the anchor bolt the method comprising:

inserting the anchor into the drilled hole; and creating an undercut in the drilled hole via the anchor by turning the expansion sleeve via the anchor bolt, the turning of the expansion sleeve creating the undercut.

2. The method as recited in claim 1 wherein the expansion sleeve has at least one slit.

3. The method as recited in claim 2 wherein the rotary catch has a projection protruding from the anchor bolt and engaging with the slit, or, on the slit, the expansion sleeve has a bent section forming the cutting projection.

4. The method as recited in claim 3 wherein the projection protruding from the anchor bolt and forming the rotary catch is a web.

5. The method as recited in claim 4 wherein the web extends in the expansion section, at least in certain areas, or in that the web widens as the distance from the stop increases.

6. The method as recited in claim 2 wherein the surface of force application is an external polygon.

7. The method as recited in claim 1 wherein the anchor bolt has a surface of force application.

8. The method as recited in claim 1 wherein that the anchor bolt has an external thread, a nut having an internal thread corresponding to the external thread being arranged on the external thread.

\* \* \* \* \*